Oct. 4, 1927.
O. W. NESBITT
1,644,077
ANTISKID DEVICE FOR MOTOR VEHICLE WHEELS
Filed Aug. 11, 1924
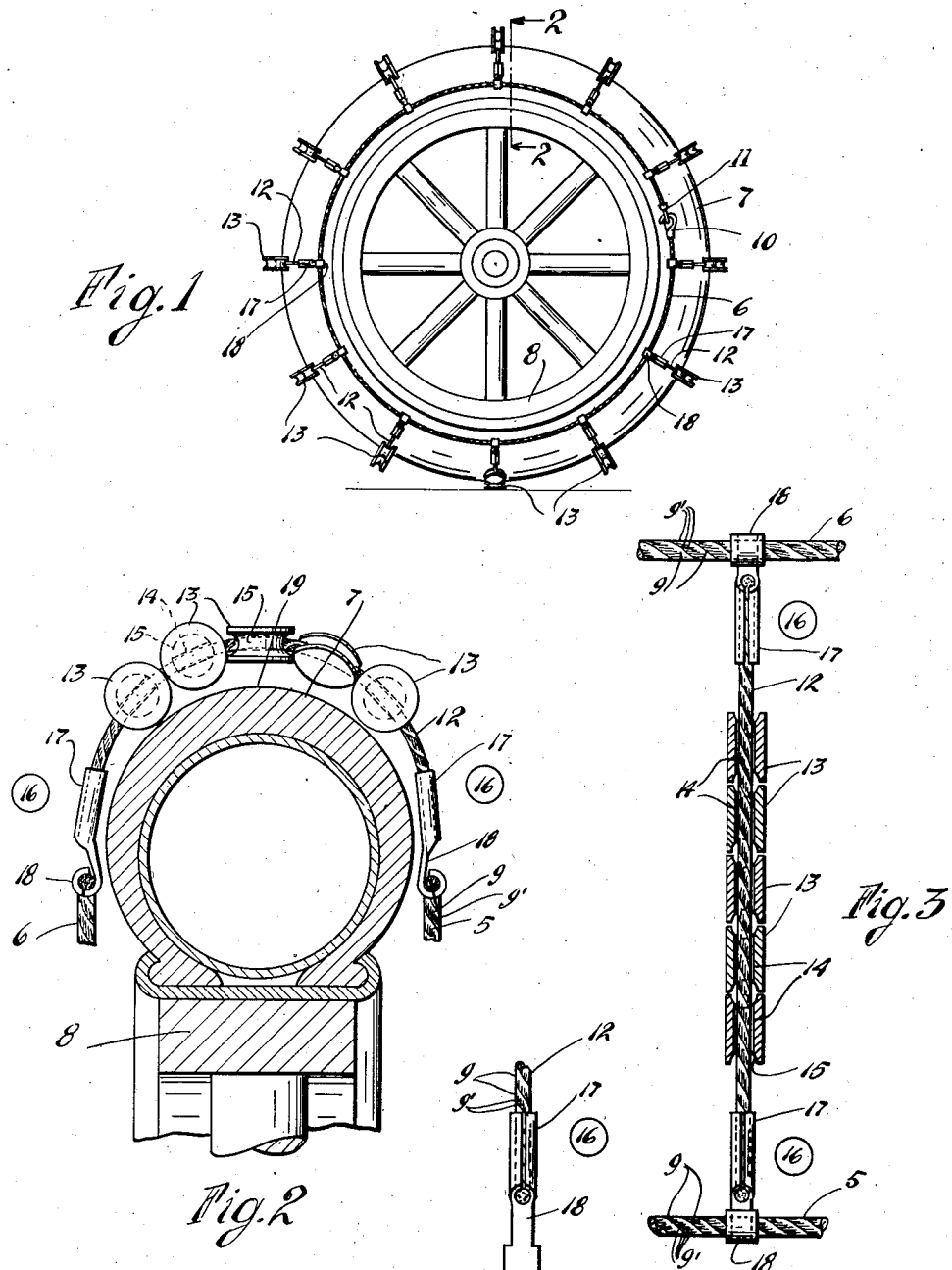

Patented Oct. 4, 1927.

1,644,077

UNITED STATES PATENT OFFICE.

ORVILLE W. NESBITT, OF CHICAGO, ILLINOIS.

ANTISKID DEVICE FOR MOTOR-VEHICLE WHEELS.

Application filed August 11, 1924. Serial No. 731,255.

My invention relates to antiskid devices for motor vehicle wheels, and has for its primary object the provision of an improved construction of this character which will be highly efficient in use and economical in manufacture.

Another object of my invention is the provision of a novel and useful device of the character specified, embodying antiskid members which are separately movable and which tend under the influence of centrifugal force during the travelling of the wheel, to crowd upon one another to the position best adapted to give a traction grip to the wheel.

Another object is the provision of a device of this character, which is readily attached to the wheel and as readily removed therefrom, which embodies features of construction that will facilitate quick repairs and replacement of parts, and which, additionally, requires comparatively little space for its storage when removed from the wheel.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view showing my improved device as applied to a motor vehicle wheel, Fig. 2 is a cross section taken on line 2—2 of Fig. 1, Fig. 3 is a detailed view of a cross element illustrating in particularity how the same is connected to the side elements and also illustrating in section the antiskid members rotatably carried thereby, and Fig. 4 shows a detailed view of the T-shaped members which are attached to the extremities of the cross elements.

In referring with particularity to the embodiment shown in the accompanying drawing, it will be seen that in the production of my improved antiskid device I employ side elements 5 and 6 for connecting the structure upon the tire 7 of a wheel 8 of a motor vehicle. The side elements 5 and 6 consist of bendable cables, made of steel wire and constructed of twisted, closely inlaid strands 9 which in turn are made up of bundles of smaller sized strands 9'. To one extremity of each of the cables 5 and 6 is secured a snapper device 10. To the opposite extremities of the cables 5 and 6 are secured rings 11 with which the snapper devices are adapted to be connected in order to secure the ends of the side members together as clearly shown in Fig. 1.

For the support of my novel antiskid members transversely of the tire 7 I employ cross cables 12 which are equipped at their extremities with means whereby to connect them with and between the side elements 5 and 6. The cables 12 are also made of stranded, twisted and inlaid steel wire, as before. Rotatably mounted upon the cross cables are antiskid devices 13 consisting of metallic disc-shaped members. The method of mounting these antiskid members on the cross cables consists in providing the antiskid members with diametrical apertures 14, which are of such size in cross section with respect to the cross sectional dimension of the cables 12 that the antiskid members will freely rotate thereon and in addition are adapted to have free axial movement thereon. The antiskid members 13 are also made with circumferential grooves 15 of concave form in cross section, as clearly shown in Fig. 3. It will be noted that each of the antiskid members 13 is in the form of a disk with a bore extending diametrically therethrough and whereby the anti-skid member is rendered non-circular in form about the axis of the cable 12. The cables 12 thus serve as axles for the free rotation of said anti-skid members when not in actual contact with the ground and whereby said anti-skid members are free to move and adjust themselves so that they never occupy the same relative positions in contact with the tire for any material length of time, thus avoiding undue wear on one spot in the tire. However, when the anti-skid members rest in contact with the ground, the weight of the automobile rests on them, pressing them into the ground and into the tire, thus, due to the non-circular form, preventing free rotation, or roller action, of the anti-skid members on the cables. In this manner good traction is afforded for the tires and thus skidding and slipping is prevented. For the purpose of detachably connecting the cross cables 12 to and between the side cables 5 and 6, I secure to each of the extremities of the cross cables end hooks indicated generally at 16 and consisting of a body portion 17 adapted to be crimped and soldered upon the end of the cross cable, and consisting further of a T-shaped portion 18 which is adapted to be curled and crimped upon the side cable. The cross cables 12 carrying their rotatable antiskid members are thus connected to and between the side cables 5 and 6 at equi-spaced intervals; and these cross cables are of such length with respect to the transverse curvature of the tire 7 that the antiskid members 13, particularly under centrifugal action produced by the rotation of the wheel, will be clear of the periphery of the wheel tread so as to have free rotative and axial movement on the cross cables. Obviously, during the rotation of the vehicle wheel, the cross cables 12 will tend to move outwardly or at a tangent under centrifugal force, and the antiskid members 13 will tend to crowd upon each other towards the highest point of the bow or flexure of the cross cables. Moreover, when the motor vehicle makes a quick lateral turn, the cross cables 12 have a tendency to flex centrifugally on the inner side (of the vehicle) of the circumferential central line 19 of the tire 7, and the antiskid members crowding to the highest point of the flexure are adapted to have a traction grip which occurs principally on the inner side of said circumferential central line 19 of the tire.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. An anti-skid device for tires comprising a flexible mesh arrangement and means for securing the same about the tread portion of a tire and including transverse axle members extending across the face of the tire; and anti-skid members in the form of disks having peripheral grooves and transverse diametrical bores fitting over said axle members.

2. An anti-skid device for tires comprising a flexible mesh arrangement and means for securing the same about the tread portion of a tire and including transverse axle members extending across the face of the tire; and anti-skid members in the form of discs having transverse diametrical bores fitting over said axle members.

In testimony whereof I have signed my name to this specification.

ORVILLE W. NESBITT.